(12) United States Patent
Patel et al.

(10) Patent No.: US 11,132,231 B2
(45) Date of Patent: *Sep. 28, 2021

(54) RECONFIGURING PROCESSING GROUPS FOR CASCADING DATA WORKLOADS

(71) Applicant: International Business Machines Corporation, Armonk, NY (US)

(72) Inventors: Mehulkumar J. Patel, Bangalore (IN); Krishna P. Prabhu, Bangalore (IN); Guha Prasad Venkataraman, Bangalore (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 224 days.

This patent is subject to a terminal disclaimer.

(21) Appl. No.: 16/536,734

(22) Filed: Aug. 9, 2019

(65) Prior Publication Data

US 2019/0361715 A1    Nov. 28, 2019

Related U.S. Application Data

(63) Continuation of application No. 15/860,010, filed on Jan. 2, 2018, now Pat. No. 10,423,429.

(51) Int. Cl.
*G06F 9/50* (2006.01)
*G06F 9/445* (2018.01)
(Continued)

(52) U.S. Cl.
CPC ........ *G06F 9/5027* (2013.01); *G06F 9/44505* (2013.01); *G06F 9/5061* (2013.01); *G06F 13/387* (2013.01); *G06T 1/20* (2013.01)

(58) Field of Classification Search
CPC .............................. G06F 9/5027; G06F 9/5061
See application file for complete search history.

(56) References Cited

U.S. PATENT DOCUMENTS 5,093,780 A   3/1992  Sunahara
9,535,873 B2 * 1/2017  Froening ............... G06F 15/167
(Continued)

FOREIGN PATENT DOCUMENTS

CN    105117170 A    12/2015

OTHER PUBLICATIONS

Fujita et al., *QCD Library for GPU Cluster with Proprietary Interconnect for GPU Direct Communication*, European Conference on Parallel Processing, Eur-Par 2014: Parallel Processing Workshops, Lecture Notes in Computer Science, Aug. 2014, vol. 8805, pp. 251-62, Springer International Publishing, Cham, Switzerland.

(Continued)

*Primary Examiner* — William B Partridge
(74) *Attorney, Agent, or Firm* — Teddi Maranzano

(57) ABSTRACT

Reconfiguring processing groups for cascading data workloads including receiving a request to reconfigure a computing system to execute a workload, wherein the computing system comprises a first processing group and a second processing group, wherein the first processing group comprises a first central processing unit (CPU), a first graphics processing unit (GPU), and a second GPU, and wherein the second processing group comprises a second CPU and a third GPU; reconfiguring the computing system including activating a processor link spanning the first processor group and the second processor group between the second GPU and the third GPU; and executing the workload using the first GPU, second GPU, and third GPU including cascading data, via processor links, from the first CPU to the first GPU, from the first GPU to the second GPU, and from the second GPU to the third GPU.

20 Claims, 7 Drawing Sheets

(51) Int. Cl.
    *G06T 1/20*           (2006.01)
    *G06F 13/38*        (2006.01)

(56) References Cited

U.S. PATENT DOCUMENTS

| | | | |
|---|---|---|---|
| 10,423,429 B2 * | 9/2019 | Patel | .................. G06F 9/44505 |
| 2010/0250821 A1 | 9/2010 | Mueller | |
| 2016/0292115 A1 * | 10/2016 | Akhter | ................ G06F 13/4027 |
| 2019/0205146 A1 | 7/2019 | Patel et al. | |

OTHER PUBLICATIONS

IN820161240US02, Appendix P; List of IBM Patent or Applications Treated as Related, Aug. 9, 2019, 2 pages.

\* cited by examiner

RECONFIGURING PROCESSING GROUPS FOR CASCADING DATA WORKLOADS

CROSS-REFERENCE TO RELATED APPLICATION

This application is a continuation application of and claims priority from U.S. patent application Ser. No. 15/860,010, filed Jan. 2, 2018.

BACKGROUND

Field of the Invention

The field of the invention is data processing, or, more specifically, methods, apparatus, and products for reconfiguring processing groups for cascading data workloads.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for reconfiguring processing groups for cascading data workloads are disclosed in this specification. Reconfiguring processing groups for cascading data workloads includes receiving a request to reconfigure a computing system to execute a workload, wherein the computing system comprises a first processing group and a second processing group, wherein the first processing group comprises a first central processing unit (CPU), a first graphics processing unit (GPU), and a second GPU, and wherein the second processing group comprises a second CPU and a third GPU; reconfiguring the computing system including deactivating a processor link between the first CPU and the second GPU, deactivating a processor link between the second CPU and the third GPU, and activating a processor link spanning the first processor group and the second processor group between the second GPU and the third GPU; and executing the workload using the first GPU, second GPU, and third GPU including cascading data, via processor links, from the first CPU to the first GPU, from the first GPU to the second GPU, and from the second GPU to the third GPU.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
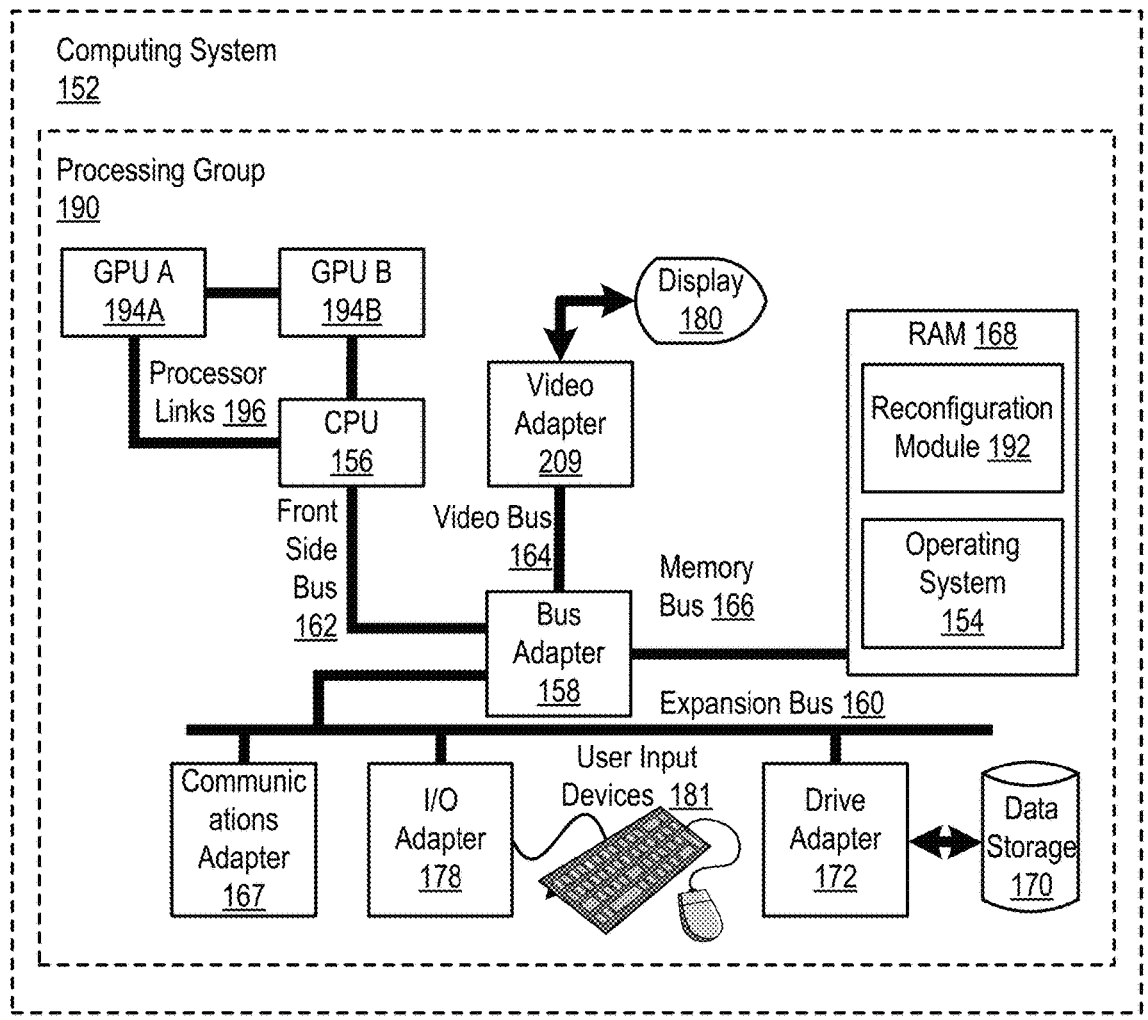
FIG. 1 sets forth a block diagram of an example system configured for reconfiguring processing groups for cascading data workloads according to embodiments of the present invention.

Exemplary methods, apparatus, and products for reconfiguring processing groups for cascading data workloads in accordance with the present invention are described with reference to the accompanying drawings, beginning with FIG. 1. FIG. 1 sets forth a block diagram of automated computing machinery comprising an exemplary computing system (152) configured for reconfiguring processing groups for cascading data workloads according to embodiments of the present invention. The computing system (152) of FIG. 1 includes at least one processing group (190). The processing group (190) includes at least one computer processor or central processing unit (CPU) (156) as well as random access memory (168) ('RAM') which is connected through a high speed memory bus (166) and bus adapter (158) to CPU (156) and to other components of the processing group (190). The processing group (190) also includes multiple graphics processing units (GPUs) (GPU A (194A), GPU B (194B)) coupled to the CPU (156) via processor links (196).

Stored in RAM (168) is an operating system (154). Operating systems useful in computers configured for reconfiguring processing groups for cascading data workloads according to embodiments of the present invention include UNIX™, Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on a disk drive (170). Also stored in RAM is a reconfiguration module (192), a module for reconfiguring processing groups for cascading data workloads according to embodiments of the present invention.

The processing group (190) of FIG. 1 includes disk drive adapter (172) coupled through expansion bus (160) and bus adapter (158) to CPU (156) and other components of processing group (190). Disk drive adapter (172) connects non-volatile data storage to the processing group (190) in the form of data storage (170). Disk drive adapters useful in computers configured for reconfiguring processing groups for cascading data workloads according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example processing group (190) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example processing group (190) of FIG. 1 includes a video adapter (209), which is an example of an I/O adapter specially designed for graphic output to a display device (180) such as a display screen or computer monitor. Video adapter (209) is connected to CPU (156) through a high speed video bus (164), bus adapter (158), and the front side bus (162), which is also a high speed bus.

The example processing group (190) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for reconfiguring processing groups for cascading data workloads according to embodiments of the present invention include modems for wired dial-up communications, Ethernet (IEEE 802.3) adapters for wired data communications, and 802.11 adapters for wireless data communications.

Figure 2:
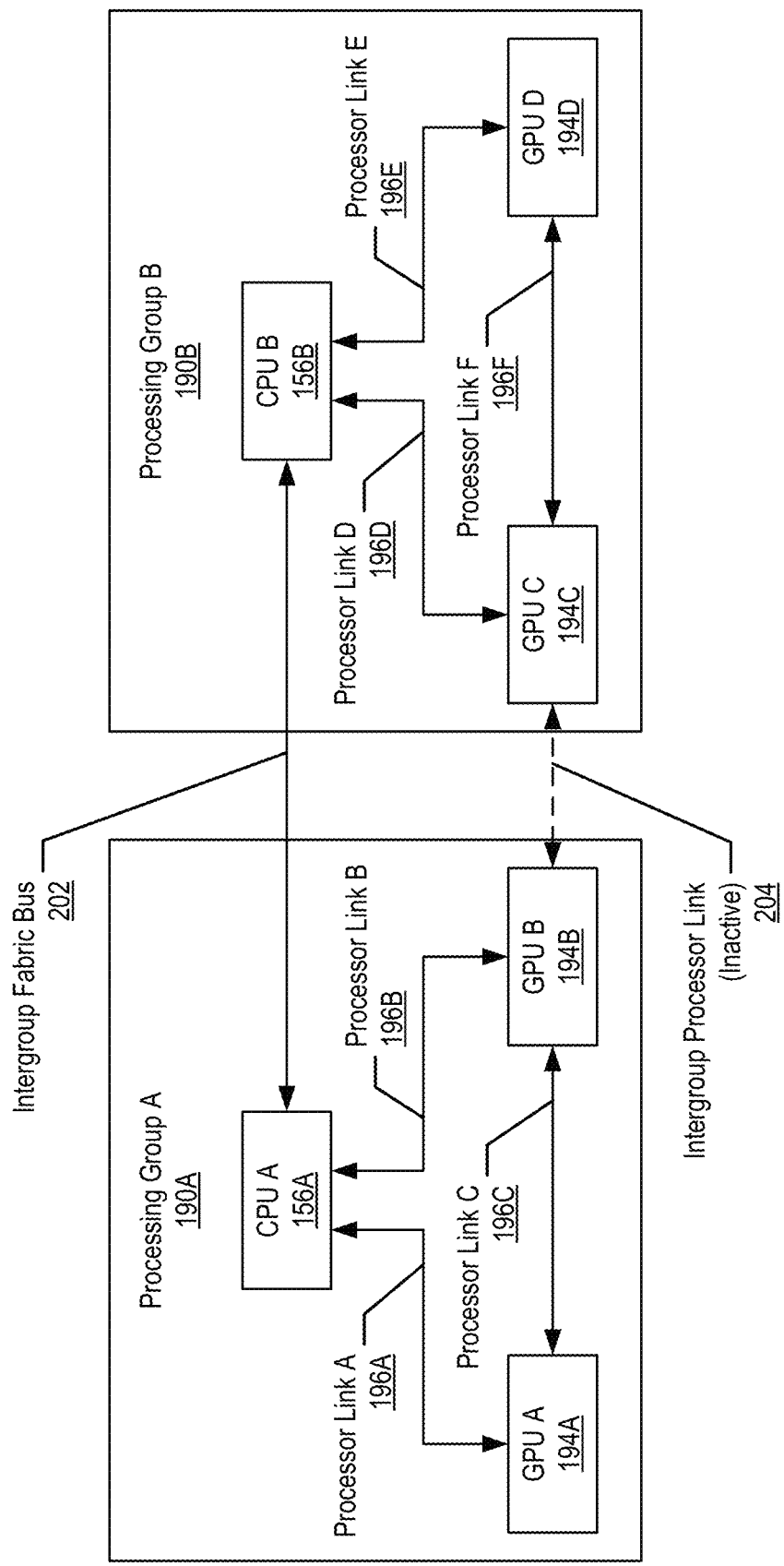
FIG. 2 sets forth a block diagram of an example system configured for reconfiguring processing groups for cascading data workloads according to embodiments of the present invention.

FIG. 2 shows an exemplary system for reconfiguring processing groups for cascading data workloads according to embodiments of the present invention. As shown in FIG. 2, the exemplary system includes processing group A (190A) and processing group B (190B). Processing group A (190A) includes CPU A (156A), GPU A (194A), and GPU B (194B). CPU A (156A) is coupled to GPU A (194A) via processor link A (196A). CPU A (156A) is coupled to GPU B (194B) via processor link B (196B). Finally, GPU A (194A) is coupled to GPU B (194B) via processor link C (196C). The exemplary system of FIG. 2 depicts two GPUs directly accessible by each CPU in each processing group, and two processing groups on the system, each with one CPU. However, there need not be a restriction on the number of GPUs available within a processing group or the number of processing groups on a system. The number of processing groups on the system may be determined, for example, by the number of CPU sockets present.

Processing group B (190B) includes CPU B (156B), GPU C (194C), and GPU D (194D). CPU B (156B) is coupled to GPU C (194C) via processor link D (196D). CPU B (156B) is coupled to GPU D (194D) via processor link E (196E). Finally, GPU C (194C) is coupled to GPU D (194D) via processor link F (196F).

As shown in the exemplary system of FIG. 2, processing group A (190A) is coupled to processing group B (190B) via two communication paths. CPU A (156A) is coupled to CPU B (156B) via the intergroup fabric bus (202). Also, GPU B (194B) is coupled to GPU C (194C) via the inactive intergroup processor link (204).

The processing groups (processing group A (190A), processing group B (190B)) are collections of computing elements on a system. Each processing group may be assigned all of a workload or part of a single workload that is executed on multiple processing groups. The processing groups communicate with one another, in part, using the intergroup fabric bus (202) between CPUs on each processing group.

The CPUs (CPU A (156A), CPU B (156B)) are processing units that manage the execution of a workload or part of a workload. The GPUs (GPU A (194A), GPU B (194B), GPU C (194C), GPU D (194D)) are accelerators that aid the CPUs in executing workloads. The GPUs may handle a variety of data processing tasks, including process non-graphic tasks, such as audio or mathematical computations.

The processor links (processor link A (196A), processor link B (196B), processor link C (196C), processor link D (196D), processor link E (196E), processor link F (196F), intergroup processor link (204)) are high speed interconnects configured to transmit data between a CPU and a GPU or between two GPUs. The processor links may transmit data directly between a CPU and a GPU or between two GPUs, in that there exists no intermediary switch or other computing element on the processor link between the CPU and the GPU or between the two GPUs. Each processor link may also be distinct from switching fabrics in that each processor link may include exactly two endpoints. The processor links are not peripheral component interconnects. The processor links may be NVlink™ interconnects.

The intergroup processor link (204) differs from the other processor links (processor link A (196A), processor link B (196B), processor link C (196C), processor link D (196D), processor link E (196E), processor link F (196F)) in that the intergroup processor link (204) is a processor link spanning two processing groups (processing group A (190A), processing group B (190B)). The intergroup processor link (204) may be otherwise indistinguishable from the other processor links (processor link A (196A), processor link B (196B), processor link C (196C), processor link D (196D), processor link E (196E), processor link F (196F)).

Each CPU (CPU A (156A), CPU B (156B)) may be limited in the number of GPUs to which the CPU is able to connect via a processor link. For example, each CPU may be limited to connecting to no more than two GPUs. Similarly, each GPU (GPU A (194A), GPU B (194B), GPU C (194C), GPU D (194D)) may be limited in the number of CPUs and/or GPUs to which the GPU is able to connect via a processor link. For example, each GPU may be limited to connecting to either one CPU and one GPU, or two GPUs.

The intergroup fabric bus (202) is a communications bus between two CPUs within different processing groups. The intergroup fabric bus (202) may directly couple two CPUs such that no intermediary switch or other computing element exits between the CPUs. The intergroup fabric bus (202) is not a processor link and is not a peripheral component interconnect.

The exemplary system of FIG. 2 depicts the intergroup processer link (204) as inactive. A workload may be executed on the exemplary system of FIG. 2, as shown, using both processing groups (processing group A (190A), processing group B (190B)). However, data processed by one GPU on one processing group is unable to be sent directly to another GPU on a different processing group. Rather, the data is sent from the GPU to the CPU (via DMA to memory) within the same processing group, then sent from the CPU within the same processing group to the CPU within the target processing group via an intergroup fabric bus, and finally sent from the CPU within the target processing group to the target GPU.

For example, assume that data on GPU B (194B) is to be sent to GPU C (194C). The data sent from GPU B (194B) on the processing group A (190A) would be sent from GPU B (194B) to CPU A (156A), then from CPU A (156A) along the intergroup fabric bus (202) to CPU B (156B), and finally from CPU B (156B) to GPU C (194C).

The exemplary system shown in FIG. 2 may be the default system configuration. Specifically, the exemplary system shown in FIG. 2 may be the configuration to which alterations are made in order to effectively execute workloads requiring or benefiting from a reconfiguration of the default system shown in FIG. 2.

Figure 3:
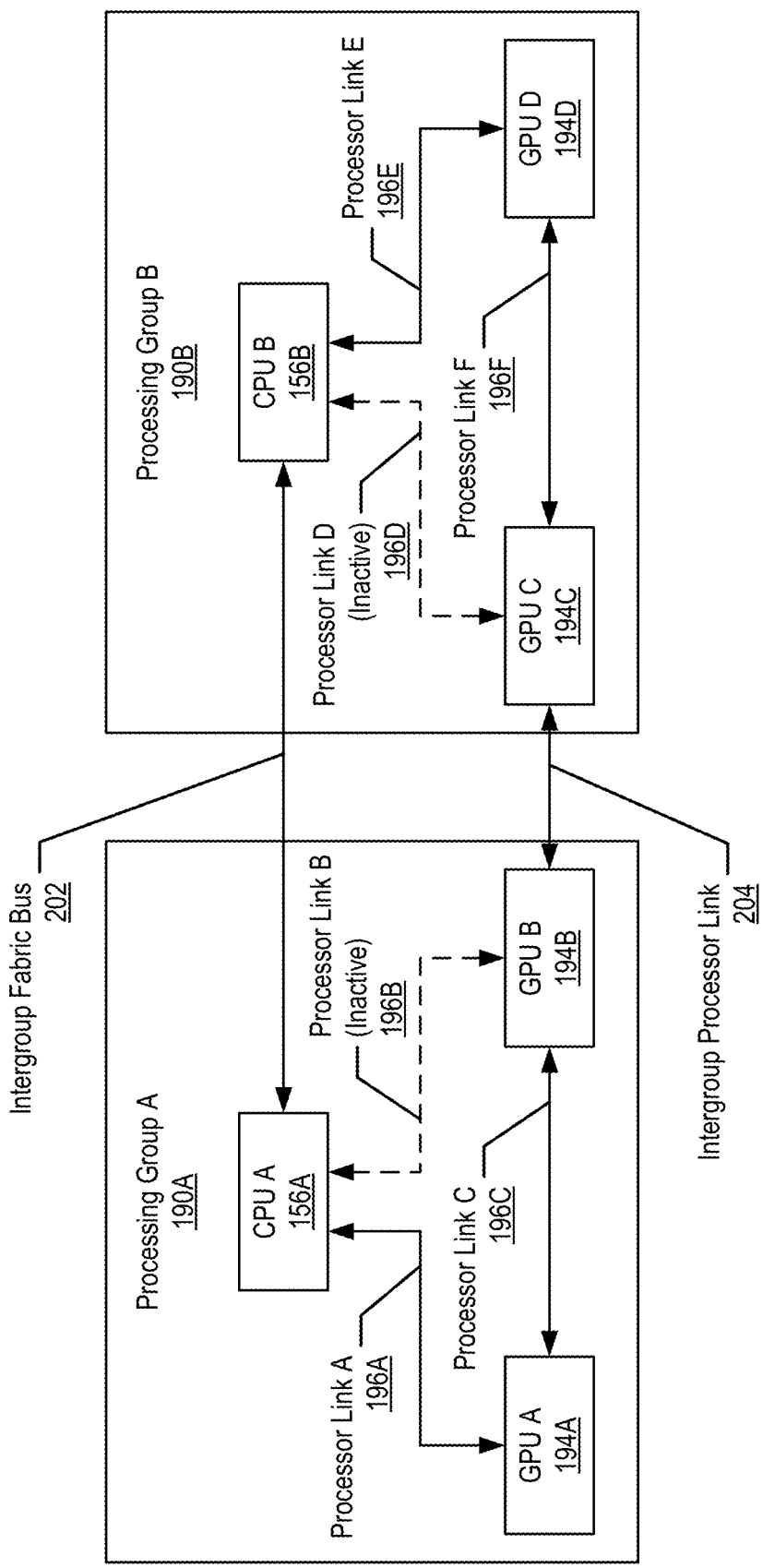
FIG. 3 sets forth a block diagram of an example system configured for reconfiguring processing groups for cascading data workloads according to embodiments of the present invention.

FIG. 3 shows an exemplary system for reconfiguring processing groups for cascading data workloads according to embodiments of the present invention. FIG. 3 shows a reconfiguration of the system depicted in FIG. 2. Specifically, processor link B (196B) and processor link D (196D) have been deactivated, and the intergroup processor link (204) has been activated. In the exemplary system of FIG. 3, GPU B (194B) and GPU C (194C) are directly coupled to one another via the intergroup processor link (204) and may exchange data bypassing the CPUs and the intergroup fabric bus (202).

A processor link is activated by transitioning the processor link from a deactivated or disconnected state to an activated or connected state. In an active state, each CPU or GPU coupled to the active processor link may use the active processor link to transmit and receive data from another CPU or GPU coupled to the active processor link. A processor link is deactivated by transitioning the processor link from an activated or connected state to an inactivated or disconnected state. In an inactive state, the inactive processor link is unavailable for use to transmit or receive data between the GPUs coupled to the processor link or between the CPU and GPU coupled to the processor link.

Processor links (processor link A (196A), processor link B (196B), processor link C (196C), processor link D (196D), processor link E (196E), processor link F (196F)) may be activated or deactivated using a bus multiplexer. A bus multiplexer is a device that selects one of several input signals and forwards the input signal to an output line. For example, in order to deactivate processor link B (196) and activate the intergroup processor link (204), a bus multiplexer may deselect the input signal from CPU A (190A) to GPU B (194B) and select the input signal from GPU C (194C) to GPU B (194B). The example system of FIGS. 2 and 3 may include multiple bus multiplexers. The bus multiplexer may be controlled via signals received from a reconfiguration module. Activating the bus multiplexer may provide a static setup performed once at the system boot time. The bus multiplexer may be unable to be activated while the system is running (i.e., during runtime).

Figure 4:
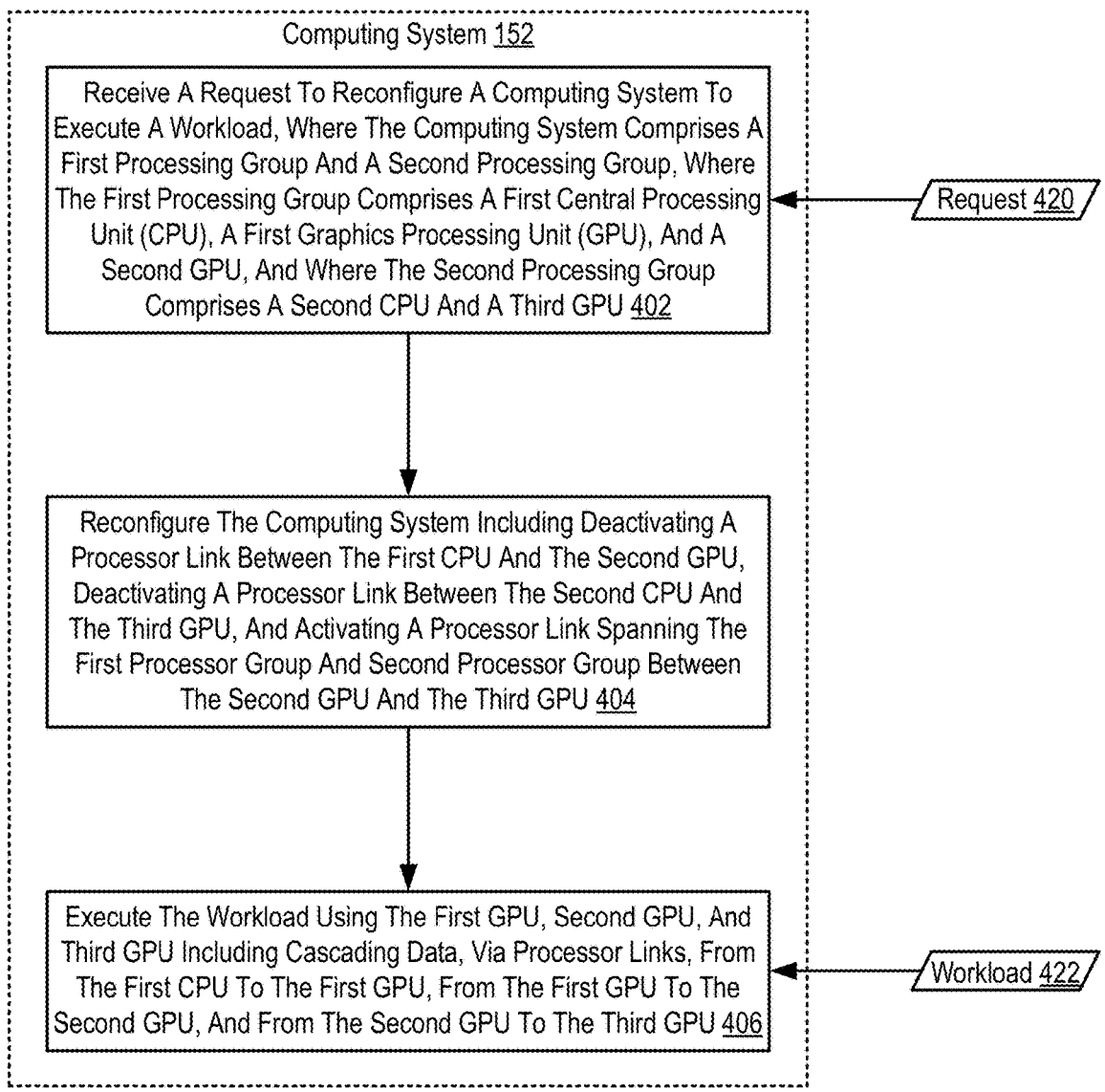
FIG. 4 sets forth a flow chart illustrating an exemplary method for reconfiguring processing groups for cascading data workloads according to embodiments of the present invention.

For further explanation, FIG. 4 sets forth a flow chart illustrating an exemplary method for reconfiguring processing groups for cascading data workloads according to embodiments of the present invention that includes receiving (402) a request (420) to reconfigure a computing system to execute a workload (422), wherein the computing system comprises a first processing group and a second processing group, wherein the first processing group comprises a first central processing unit (CPU), a first graphics processing unit (GPU), and a second GPU, and wherein the second processing group comprises a second CPU and a third GPU. Receiving (402) a request (420) to reconfigure a computing system to execute a workload (422), wherein the computing system comprises a first processing group and a second processing group, wherein the first processing group comprises a first central processing unit (CPU), a first graphics processing unit (GPU), and a second GPU, and wherein the second processing group comprises a second CPU and a third GPU may be carried out by a user instructing a reconfiguration module to reconfigure the system.

The received request may include a specific configuration desired by the user to execute the workload. Alternatively, the received request may include only a type of workload intending to be executed. The reconfiguration module may determine, based on the type of workload, a particular configuration that matches or suits the type or workload received in the request. For example, the request (420) may indicate that a user intends to execute a deep learning workload. The reconfiguration module may determine that deep learning workloads perform more efficiently using a GPU configuration allowing for data to be cascaded between GPUs. The reconfiguration module may retrieve a configuration model corresponding to deep learning workloads from a configuration model repository and prepare to reconfigure the system based on the configuration model.

The method of FIG. 4 further includes reconfiguring (404) the computing system including deactivating a processor link between the first CPU and the second GPU, deactivating a processor link between the second CPU and the third GPU, and activating a processor link spanning the first processor group and the second processor group between the second GPU and the third GPU. Reconfiguring (404) the computing system including deactivating a processor link between the first CPU and the second GPU, deactivating a processor link between the second CPU and the third GPU, and activating a processor link spanning the first processor group and the second processor group between the second GPU and the third GPU may be carried out by a reconfiguration module sending signals to elements within the computing system to activate or deactivate specific processor links.

The computing system may be reconfigured based on the characteristics of the workload. For example, the reconfiguration module may access the workload and evaluate the content of the workload. Based on the evaluation, the reconfiguration module may select a corresponding configuration to execute the workload.

The computing system may be reconfigured at boot time. Specifically, the reconfiguration may be performed as part of the setup process for the computing system. Reconfiguring the computing system at boot time may include reconfiguring the computing system before the execution of the workload initiates.

Steps 402 and 404 may be performed by, or primarily by, a reconfiguration module. The reconfiguration module is software, hardware, or an aggregation of software and hardware that receives the request to reconfigure and initiates the reconfiguration process. The reconfiguration module may also evaluate the intended workload and workload characteristics and select a corresponding configuration model to execute the workload based on the workload characteristics.

The method of FIG. 4 further includes executing (406) the workload (422) using the first GPU, second GPU, and third GPU including cascading data, via processor links, from the first CPU to the first GPU, from the first GPU to the second GPU, and from the second GPU to the third GPU. Executing (406) the workload (422) using the first GPU, second GPU, and third GPU including cascading data, via processor links, from the first CPU to the first GPU, from the first GPU to the second GPU, and from the second GPU to the third GPU may be carried out by utilizing the previously activated processor links to execute the workload. Cascading data refers to receiving data from one processing unit, such as a CPU or GPU, processing or manipulating the received data, and subsequently providing the processed data to a different processing unit, such as a GPU.

For example, for a deep learning workload, one image may be provided from a CPU to a first GPU. The first GPU may compute certain characteristics of the image, such as gradients and solver optimization. The image and computations may then be sent from the first GPU to a second GPU to verify the computations for the image. The image and computations may then be sent from the second GPU to a third GPU to further verify the computations for the image or to resolve inconsistencies in the computations. The process of sending data out from a CPU may be referred to as forward propagation. The image and computational results may then be sent back up to the CPU from the third GPU and through the second GPU and first GPU. The process of sending data toward a CPU from the GPUs may be referred to as backward propagation.

Once the workload (422) is executed, the computing system may generate a workload output and provide the workload output to a user. The workload output may include workload data processed by cascading data between at least three GPUs.

Figure 5:
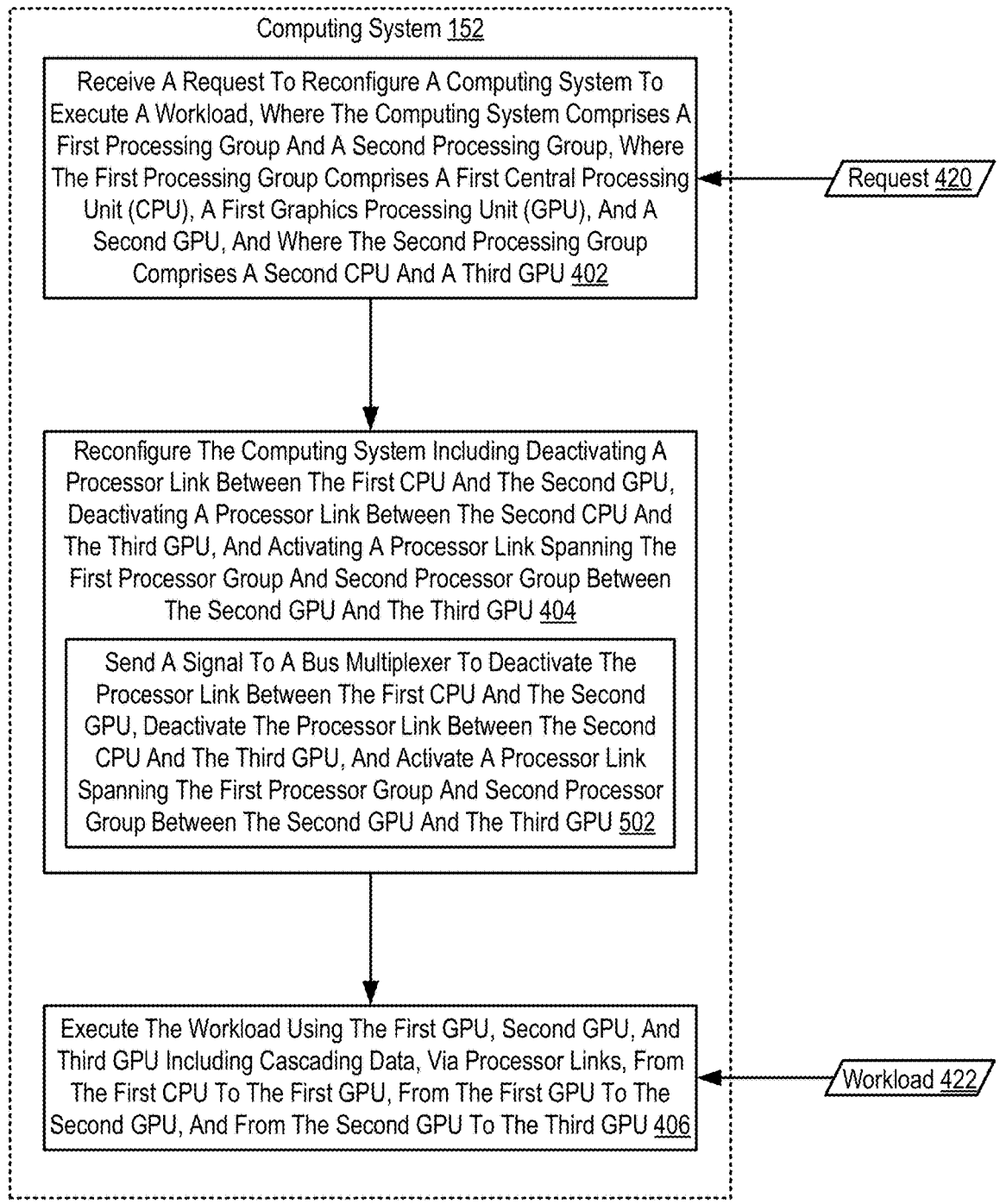
FIG. 5 sets forth a flow chart illustrating an exemplary method for reconfiguring processing groups for cascading data workloads according to embodiments of the present invention.

For further explanation, FIG. 5 sets forth a flow chart illustrating a further exemplary method for reconfiguring processing groups for cascading data workloads according to embodiments of the present invention that includes receiving (402) a request (420) to reconfigure a computing system to execute a workload (422), wherein the computing system comprises a first processing group and a second processing group, wherein the first processing group comprises a first central processing unit (CPU), a first graphics processing unit (GPU), and a second GPU, and wherein the second processing group comprises a second CPU and a third GPU; reconfiguring (404) the computing system including deactivating a processor link between the first CPU and the second GPU, deactivating a processor link between the second CPU and the third GPU, and activating a processor link spanning the first processor group and the second processor group between the second GPU and the third GPU; and executing (406) the workload (422) using the first GPU, second GPU, and third GPU including cascading data, via processor links, from the first CPU to the first GPU, from the first GPU to the second GPU, and from the second GPU to the third GPU.

The method of FIG. 5 differs from the method of FIG. 4, however, in that reconfiguring (404) the computing system including deactivating a processor link between the first CPU and the second GPU, deactivating a processor link between the second CPU and the third GPU, and activating a processor link spanning the first processor group and the second processor group between the second GPU and the third GPU includes sending (502) a signal to a bus multiplexer to deactivate the processor link between the first CPU and the second GPU, deactivate the processor link between the second CPU and the third GPU, and activate a processor link spanning the first processor group and the second processor group between the second GPU and the third GPU.

Sending (502) a signal to a bus multiplexer to deactivate the processor link between the first CPU and the second GPU, deactivate the processor link between the second CPU and the third GPU, and activate a processor link spanning the first processor group and the second processor group between the second GPU and the third GPU may be carried out by a reconfiguration module sending the signal to one or more bus multiplexers. In response, the bus multiplexer may select and deselect signals on the processor link causing one or more processor links between a CPU and GPU or between two GPUs to become active or inactive.

Figure 6:
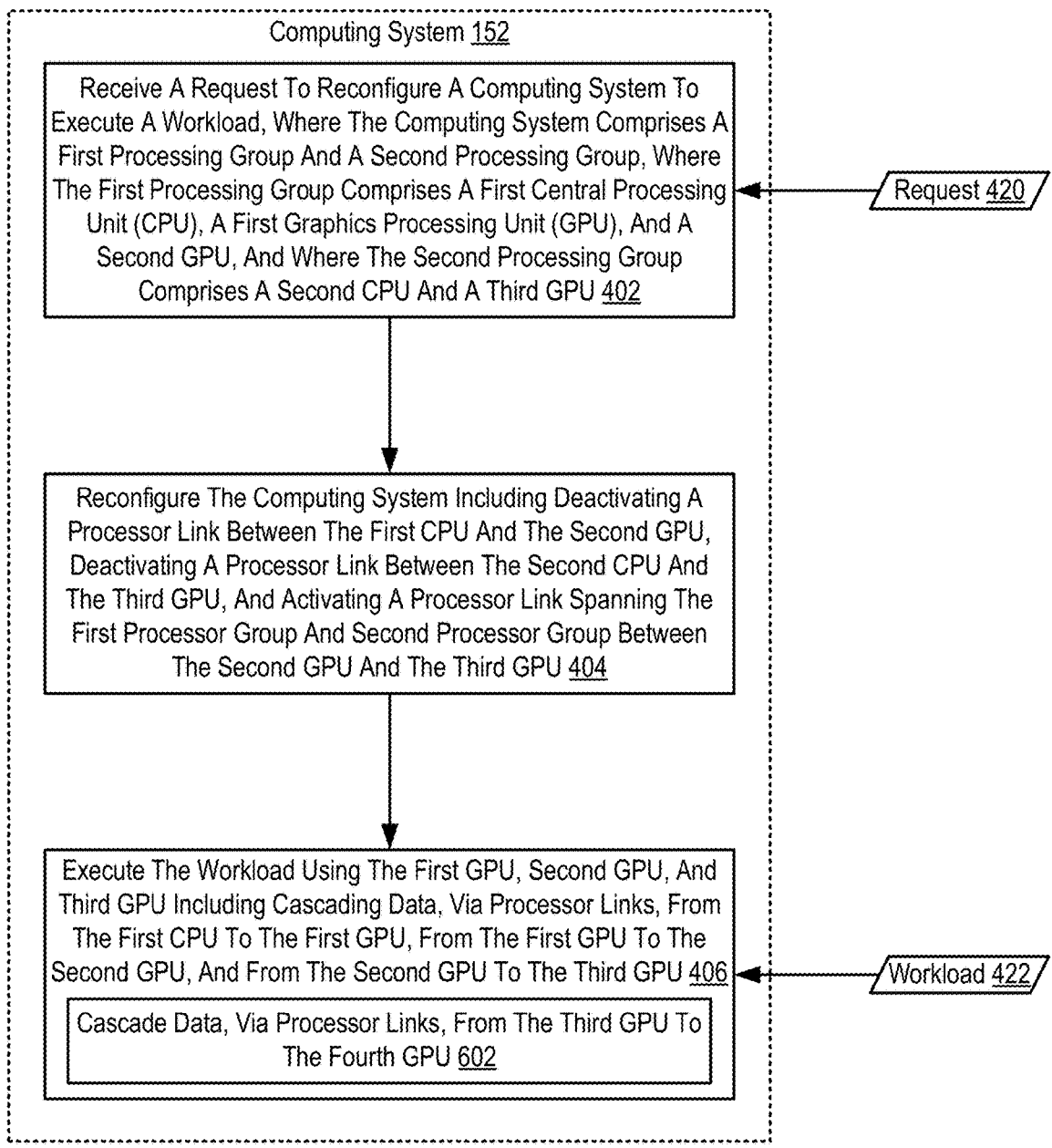
FIG. 6 sets forth a flow chart illustrating an exemplary method for reconfiguring processing groups for cascading data workloads according to embodiments of the present invention.

For further explanation, FIG. 6 sets forth a flow chart illustrating a further exemplary method for reconfiguring processing groups for cascading data workloads according to embodiments of the present invention that includes receiving (402) a request (420) to reconfigure a computing system to execute a workload (422), wherein the computing system comprises a first processing group and a second processing group, wherein the first processing group comprises a first central processing unit (CPU), a first graphics processing unit (GPU), and a second GPU, and wherein the second processing group comprises a second CPU and a third GPU; reconfiguring (404) the computing system including deactivating a processor link between the first CPU and the second GPU, deactivating a processor link between the second CPU and the third GPU, and activating a processor link spanning the first processor group and the second processor group between the second GPU and the third GPU; and executing (406) the workload (422) using the first GPU, second GPU, and third GPU including cascading data, via processor links, from the first CPU to the first GPU, from the first GPU to the second GPU, and from the second GPU to the third GPU.

The method of FIG. 6 differs from the method of FIG. 4, however, in that executing (406) the workload (422) using the first GPU, second GPU, and third GPU including cascading data, via processor links, from the first CPU to the first GPU, from the first GPU to the second GPU, and from the second GPU to the third GPU includes cascading (602) data, via processor links, from the third GPU to the fourth GPU. Cascading (602) data, via processor links, from the third GPU to the fourth GPU may be carried out by sending processed data directly from the third GPU on the second processing group to the fourth GPU on the second processing group using the processor link between the third GPU and the fourth GPU. The data cascaded from the third GPU to the fourth GPU may be processed data received from the second GPU on the first processing group. The forth GPU may be coupled to the second CPU via a processor link.

Figure 7:
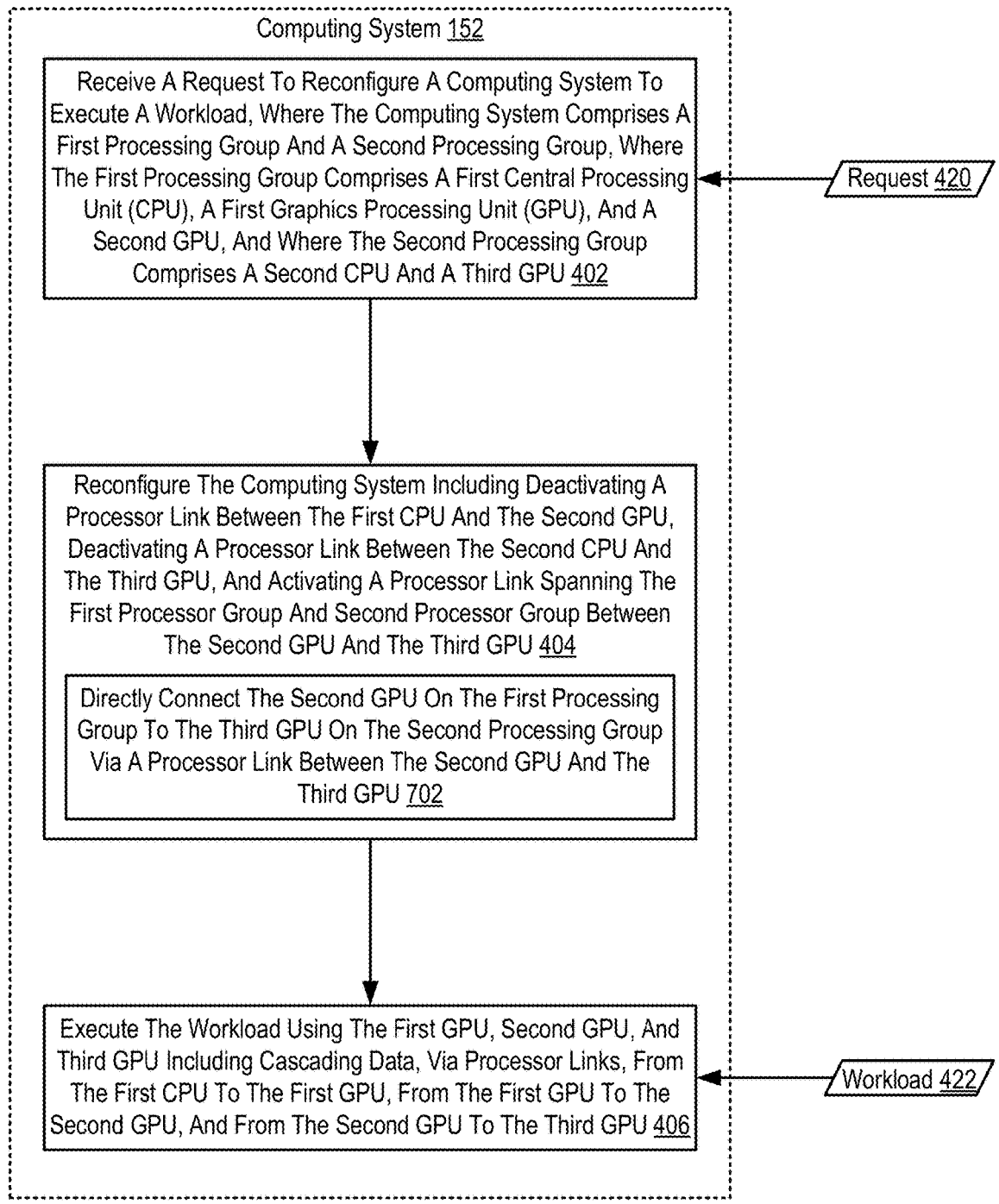
FIG. 7 sets forth a flow chart illustrating an exemplary method for reconfiguring processing groups for cascading data workloads according to embodiments of the present invention.

For further explanation, FIG. 7 sets forth a flow chart illustrating a further exemplary method for reconfiguring processing groups for cascading data workloads according to embodiments of the present invention that includes receiving (402) a request (420) to reconfigure a computing system to execute a workload (422), wherein the computing system comprises a first processing group and a second processing group, wherein the first processing group comprises a first central processing unit (CPU), a first graphics processing unit (GPU), and a second GPU, and wherein the second processing group comprises a second CPU and a third GPU; reconfiguring (404) the computing system including deactivating a processor link between the first CPU and the second GPU, deactivating a processor link between the second CPU and the third GPU, and activating a processor link spanning the first processor group and the second processor group between the second GPU and the third GPU; and executing (406) the workload (422) using the first GPU, second GPU, and third GPU including cascading data, via processor links, from the first CPU to the first GPU, from the first GPU to the second GPU, and from the second GPU to the third GPU.

The method of FIG. 7 differs from the method of FIG. 4, however, in that reconfiguring (404) the computing system including deactivating a processor link between the first CPU and the second GPU, deactivating a processor link between the second CPU and the third GPU, and activating a processor link spanning the first processor group and the second processor group between the second GPU and the third GPU includes directly connecting (702) the second GPU on the first processing group to the third GPU on the second processing group via a processor link between the second GPU and the third GPU.

Directly connecting (702) the second GPU on the first processing group to the third GPU on the second processing group via a processor link between the second GPU and the third GPU may be carried out by signaling a bus multiplexer to activate the processor link between the second GPU and the third GPU spanning the first processing group and the second processing group. The processor link may be directly connecting the second GPU and the third GPU in that there exists no intermediary switch or other computing element between the second GPU and the third GPU.

In view of the explanations set forth above, readers will recognize that the benefits of reconfiguring processing groups for cascading data workloads according to embodiments of the present invention include:

Improving the operation of a computing system by allowing reconfiguration based on the characteristics of different workloads, increasing computing system efficiency.

Improving the operation of a computing system by reconfiguring a computing system for workloads that benefit from multiple GPUs capable of cascading data between them, increasing computing system functionality and efficiency.

Exemplary embodiments of the present invention are described largely in the context of a fully functional computer system for reconfiguring processing groups for cascading data workloads. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of reconfiguring processing groups for cascading data workloads, the method comprising:
   receiving a request to reconfigure a computing system to execute a workload, wherein the computing system comprises a first processing group and a second processing group, wherein the first processing group comprises a first central processing unit (CPU) and a first graphics processing unit (GPU), and wherein the second processing group comprises a second CPU and a second GPU;
   reconfiguring the computing system including deactivating a processor link between the second CPU and the second GPU, and activating a processor link spanning the first processor group and the second processor group via a direct connection between the second GPU and the first GPU; and
   executing the workload using at least the first GPU and the second GPU, including cascading data from the first GPU to the second GPU via the processor link.

2. The method of claim 1, wherein reconfiguring the computing system comprises sending a signal to a bus multiplexer to deactivate the processor link between the first CPU and the first GPU, deactivate a processor link between the second CPU and the second GPU, and activate a processor link spanning the first processor group and the second processor group between the second GPU and the first GPU.

3. The method of claim 1, wherein the first processing group further comprises a third GPU coupled to the first GPU via a processor link, wherein the second processing group further comprises a fourth GPU coupled to the second GPU via a processor link, and wherein executing the workload using at least the first GPU and the second GPU comprises cascading data, via processor links, from the third GPU to the first GPU, from the first GPU to the second GPU, and from the second GPU to the fourth GPU.

4. The method of claim 1, wherein reconfiguring the computing system comprises directly connecting the first GPU on the first processing group to the second GPU on the second processing group via a processor link that excludes a bus.

5. The method of claim 1, wherein the computing system is reconfigured based on the characteristics of the workload.

6. The method of claim 1, wherein reconfiguring the computing system is performed at boot time.

7. The method of claim 1, wherein the first CPU in the first processing group is coupled to the second CPU in the second processing group via an intergroup bus fabric.

8. An apparatus for reconfiguring processing groups for cascading data workloads, the apparatus comprising a computer processor, a computer memory operatively coupled to the computer processor, the computer memory having disposed within it computer program instructions that, when executed by the computer processor, cause the apparatus to carry out the steps of:
   receiving a request to reconfigure a computing system to execute a workload, wherein the computing system comprises a first processing group and a second processing group, wherein the first processing group comprises a first central processing unit (CPU) and a first graphics processing unit (GPU), and wherein the second processing group comprises a second CPU and a second GPU;
   reconfiguring the computing system including deactivating a processor link between the second CPU and the second GPU, and activating a processor link spanning the first processor group and the second processor group via a direct connection between the second GPU and the first GPU; and executing the workload using at least the first GPU and the second GPU, including cascading data from the first GPU to the second GPU via the processor link.

9. The apparatus of claim 8, wherein reconfiguring the computing system comprises sending a signal to a bus multiplexer to deactivate the processor link between the first CPU and the first GPU, deactivate a processor link between the second CPU and the second GPU, and activate a processor link spanning the first processor group and the second processor group between the second GPU and the first GPU.

10. The apparatus of claim 8, wherein the first processing group further comprises a third GPU coupled to the first GPU via a processor link, wherein the second processing group further comprises a fourth GPU coupled to the second GPU via a processor link, and wherein executing the workload using at least the first GPU and the second GPU comprises cascading data, via processor links, from the third GPU to the first GPU, from the first GPU to the second GPU, and from the second GPU to the fourth GPU.

11. The apparatus of claim 8, wherein reconfiguring the computing system comprises directly connecting the first GPU on the first processing group to the second GPU on the second processing group via a processor link that excludes a bus.

12. The apparatus of claim 8, wherein the computing system is reconfigured based on the characteristics of the workload.

13. The apparatus of claim 8, wherein reconfiguring the computing system is performed at boot time.

14. The apparatus of claim 8, wherein the first CPU in the first processing group is coupled to the second CPU in the second processing group via an intergroup bus fabric.

15. A computer program product for reconfiguring processing groups for cascading data workloads, the computer program product disposed upon a non-transitory computer readable medium, the computer program product comprising computer program instructions that, when executed, cause a computer to carry out the steps of:

receiving a request to reconfigure a computing system to execute a workload, wherein the computing system comprises a first processing group and a second processing group, wherein the first processing group comprises a first central processing unit (CPU) and a first graphics processing unit (GPU), and wherein the second processing group comprises a second CPU and a second GPU;

reconfiguring the computing system including deactivating a processor link between the second CPU and the second GPU, and activating a processor link spanning the first processor group and the second processor group via a direct connection between the second GPU and the first GPU; and executing the workload using at least the first GPU and the second GPU, including cascading data from the first GPU to the second GPU via the processor link.

16. The computer program product of claim 15, wherein reconfiguring the computing system comprises sending a signal to a bus multiplexer to deactivate the processor link between the first CPU and the first GPU, deactivate a processor link between the second CPU and the second GPU, and activate a processor link spanning the first processor group and the second processor group between the second GPU and the first GPU.

17. The computer program product of claim 15, wherein the first processing group further comprises a third GPU coupled to the first GPU via a processor link, wherein the second processing group further comprises a fourth GPU coupled to the second GPU via a processor link, and wherein executing the workload using at least the first GPU and the second GPU comprises cascading data, via processor links, from the third GPU to the first GPU, from the first GPU to the second GPU, and from the second GPU to the fourth GPU.

18. The computer program product of claim 15, wherein reconfiguring the computing system comprises directly connecting the first GPU on the first processing group to the second GPU on the second processing group via a processor link that excludes a bus.

19. The computer program product of claim 15, wherein the computing system is reconfigured based on the characteristics of the workload.

20. The computer program product of claim 15, wherein reconfiguring the computing system is performed at boot time.

* * * * *